Dec. 31, 1935. R. S. TROTT 2,026,447

CONTROL MOUNTING

Original Filed Aug. 24, 1928

Inventor
Rolland S. Trott
Vernon E. Hadsell
His Attorney

Patented Dec. 31, 1935

2,026,447

UNITED STATES PATENT OFFICE 2,026,447

CONTROL MOUNTING

Rolland S. Trott, Denver, Colo.

Original application August 24, 1928, Serial No. 301,819. Divided and this application January 19, 1933, Serial No. 652,549

6 Claims. (Cl. 180—64)

This invention relates to an improvement in control mountings for power plants, and is a division of my application, Serial No. 301,819, filed August 24, 1928, on Automotive vehicles.

In automotive vehicles in which the engine unit or power plant is mounted for at least a limited freedom of movement in response to impulses incident to the operation of the engine unit, where the control element such as the clutch pedal for instance, is mounted on the engine unit, the vibrations of the engine are transmitted to the pedal causing the pedal to vibrate to the discomfort of the operator.

The object of my present invention is to permit the movement of the engine unit relative to the frame in response to impulses incident to the operation of the engine unit, but without interfering with the control of the clutch, transmission, and brakes, and such that the impulses of the engine are not transmitted to the pedal or other operating elements.

In my present invention this is accomplished by mounting the control elements such as the pedals and levers on the frame and separately mounting the engine unit for freedom of movement in response to the impulses incident to the operation thereof, and providing a connection between the control elements and the corresponding portions of the engine unit such that the vibrations of the engine unit are not transmitted to the pedals or levers. These connections may be by links or the like having provision for responding to the movements of the engine unit, so as to accommodate for such movements and will not transmit the vibration of the engine to the pedals or levers.

In the accompanying drawing.

Figure 1:
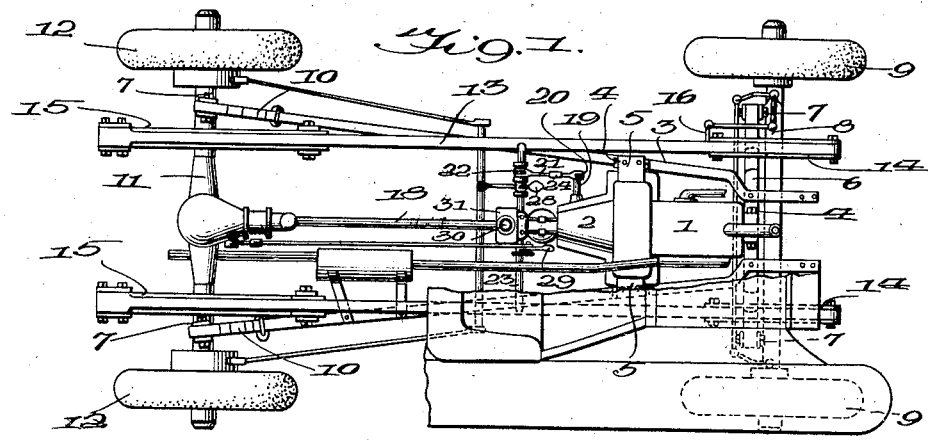
Fig. 1 is a top plan view of a portion of an automotive vehicle having the invention applied thereto.
Figure 4:
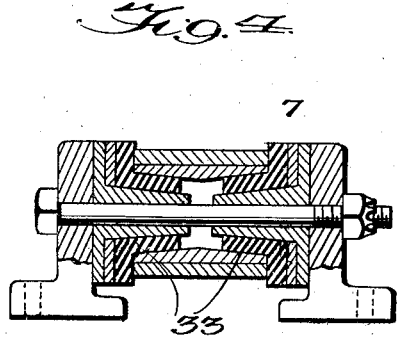
Fig. 4 is a sectional view through one of the frame mountings.

Referring to Fig. 1, I have shown my present invention as applied to a vehicle in which the engine unit is mounted for movement relative to the frame in response to the impulses incident to the operation of the engine unit. The engine unit as shown comprises the usual engine 1, and transmission housing 2, securely fastened together as a unit. The engine frame or sub-frame for supporting the engine unit is shown at 3. The engine unit is mounted on the sub-frame 3 on rubber mountings designated generally by the numeral 4, and shown in detail in Fig. 5. These mountings are carried by the sub-frame 3 and support the opposite sides of the engine unit by flanges 5, shown as attached to the sides of the flywheel housing of the engine. The front end of the sub-frame 3 is supported on a cross spring 6, which cross spring also supports directly the front end of the engine unit on a rubber mounting 4. The opposite ends of the cross spring 6 are carried by rubber mountings 7, such as shown in Fig. 4, and which are supported on the front axle 8 having the usual front wheels 9.

The rear end of the sub-frame 3 is mounted on quarter elliptical springs 10 having their free ends carried by rubber mountings 7 on the rear axle 11. The rear wheels are designated 12.

The body frame is shown at 13 and is mounted on the axles 8 and 11, independently of the mounting for the sub-frame 3. The front end of the body frame 13 is shown as supported on semi-elliptical springs 14, carried by the front axle 8, while the rear end of the body frame 13 is carried by semi-elliptical springs 15 on the rear axle 11.

The front wheels 9 are provided with the usual steering gear designated generally by the numeral 16, and controlled from the usual steering wheel mounted on the body frame.

Figure 2:
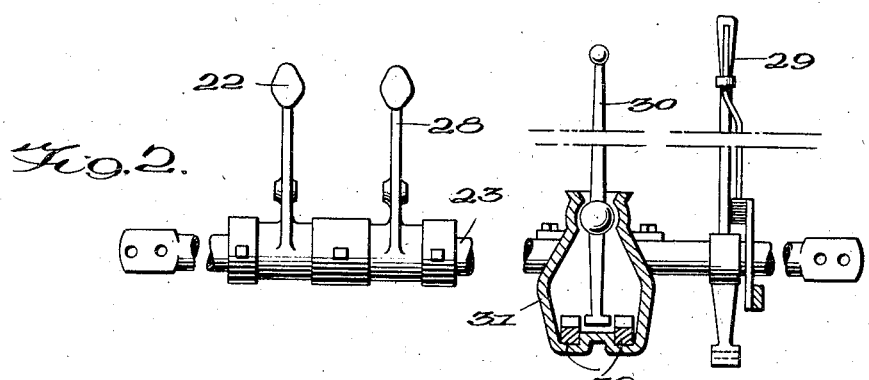
Fig. 2 is a side elevation partly in section showing the mountings for the control pedals and levers.

The housing 2 not only encloses the transmission but it also encloses the clutch which controls the transmission of power to the driving shaft 18. The clutch is operated by the usual clutch yoke and clutch shaft 19. An arm 20 is mounted on the clutch shaft and is connected by a link 21 with clutch pedal 22, shown in Fig. 2, as pivotally mounted on the cross shaft 23 having its opposite ends detachably secured to the body frame 13.

Figure 3:
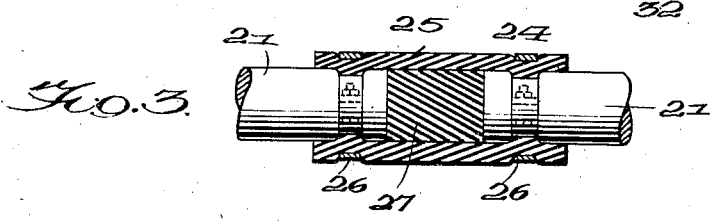
Fig. 3 is a sectional view through one of the connections.

The link 21 is in sections joined together by a flexible connection designated generally by the numeral 24 and which may be constructed as shown in Fig. 3. A non-metallic resilient sleeve 25 receives the ends of the sections of the link 21 and is clamped thereto by clamps 26, so as to securely fasten the sleeve to the sections of the link.

Interposed within the sleeve 25 between the spaced ends of the sections is a filler 27. The sleeve 25 and filler 27 are non-metallic and of cushion material, such for instance, as rubber, so as to allow flexibility of the link 21 to permit the relative movements of the engine unit and the body frame 13.

The shaft 23 also carries the usual brake pedal 28 and emergency brake lever 29, both of which are mounted thereon and are connected with the brakes by suitable connections which may be of conventional form.

The shaft 23 is shown as carrying the gear shift lever 30 pivotally supported by a housing 31 attached to the shaft 23. Shift rods 32 are mounted in the housing 31 and extend to the housing 2 for the transmission so that they may be selectively engaged by the lower end of the shift lever 30 for controlling the transmission. As shown in Fig. 1, the shift rods 32 are also provided with cushion connections 24, so that movement of the transmission with the engine unit will not transmit the vibration thereof to the gear shift lever 30.

The mounting of the engine unit is such that it may move relative to the body frame 13, but by connecting the control elements of the engine unit with the corresponding pedals and levers carried by the body frame, the vibration and movement of the engine unit is not transmitted to the frame.

The connections 21 and 32 extend longitudinally of the engine unit which relatively reduces the degree of relative movement of these parts as a result of the oscillation of the engine unit and enables the engine unit to oscillate without transmitting such vibrations to the frame or interfering with the control connections.

Figure 5:
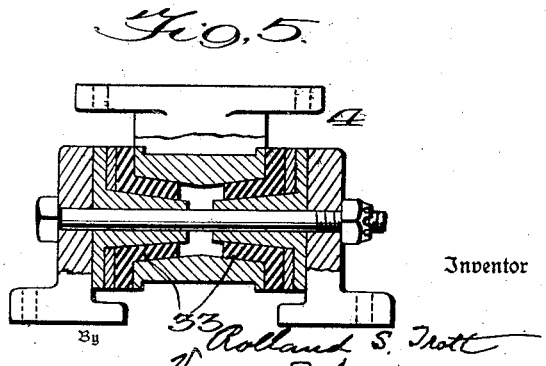
Fig. 5 is a similar view through an engine mounting.

I have shown in Figs. 4 and 5, the construction of the mountings 7 and 4 for the engine and frame, respectively. Each of these is constructed with rubber bushings designated 33 mounted in brackets so that the bushings carry the weight and cushion vibrations. At the same time, the engine mountings 4 are such that the engine may move laterally and at the same time have the necessary degree of orbital or transverse movement in any direction in response to the impulses incident to the operation of the engine unit.

The mounting of all of the control members (pedals and levers) on a single transverse frame member or shaft facilitates assembly, enabling these controls to be assembled with the engine unit and then mounted in the frame at the same time as the engine unit.

I claim:

1. In a vehicle having a frame and an engine unit movable with respect to the frame, the combination of a clutch pedal mounted on the frame, and longitudinally movable means having a universal connection connecting said clutch pedal with the engine unit to control the clutch thereof while permitting relative movements in any direction between the clutch pedal and the engine unit, said movable means being relatively rigid longitudinally.

2. In a vehicle having a frame, an engine unit having a clutch and mounted for movement relative to the frame, the combination of a clutch pedal mounted on the frame, and longitudinally movable means having a non-metallic flexible section connecting the clutch pedal with the engine unit for controlling movement substantially unaffected by movement of the engine unit relative to the frame.

3. In a vehicle having a frame, the combination with an engine unit mounted on the vehicle and having a clutch control and capable of lateral angular movement relative to the frame, of a clutch pedal mounted on the frame, and means extending longitudinally relative to the engine unit and operatively connecting the clutch pedal and clutch control providing a flexible connection therebetween unaffected by movements of the engine unit relative to the frame, said connecting means being relatively rigid longitudinally.

4. In a vehicle having a frame, the combination with an engine unit mounted on the vehicle and having a clutch control and capable of lateral angular movement relative to the frame, and means extending longitudinally relative to the engine unit and operatively connecting the clutch pedal and clutch control and having a resilient connection between the pedal and control permitting angular movements of the engine unit relative to the clutch pedal, said connecting means being relatively rigid longitudinally.

5. In a vehicle having a frame, the combination with an engine unit mounted on the vehicle and having a clutch control and being capable of lateral angular movement relative to the frame, of a clutch pedal mounted on the frame, and a connection between the clutch pedal and clutch control having at least a portion thereof non-metallic and resilient permitting angular movements of the engine unit relative to the clutch pedal, said connection being relatively rigid longitudinally.

6. In a vehicle having a frame, the combination with an engine unit mounted on the vehicle and having a clutch control and being capable of lateral angular movement relative to the frame, of a clutch pedal mounted on the frame, and means extending longitudinally relative to the engine unit and operatively connecting the clutch pedal and clutch control, said connecting means being relatively rigid longitudinally and having at least a portion thereof non-metallic and resilient permitting angular movements of the engine unit relative to the clutch pedal.

ROLLAND S. TROTT.